July 4, 1944.  E. S. STACK  2,352,919
PROGRESSIVE WATER HEATING SYSTEM
Filed May 16, 1942  3 Sheets-Sheet 1
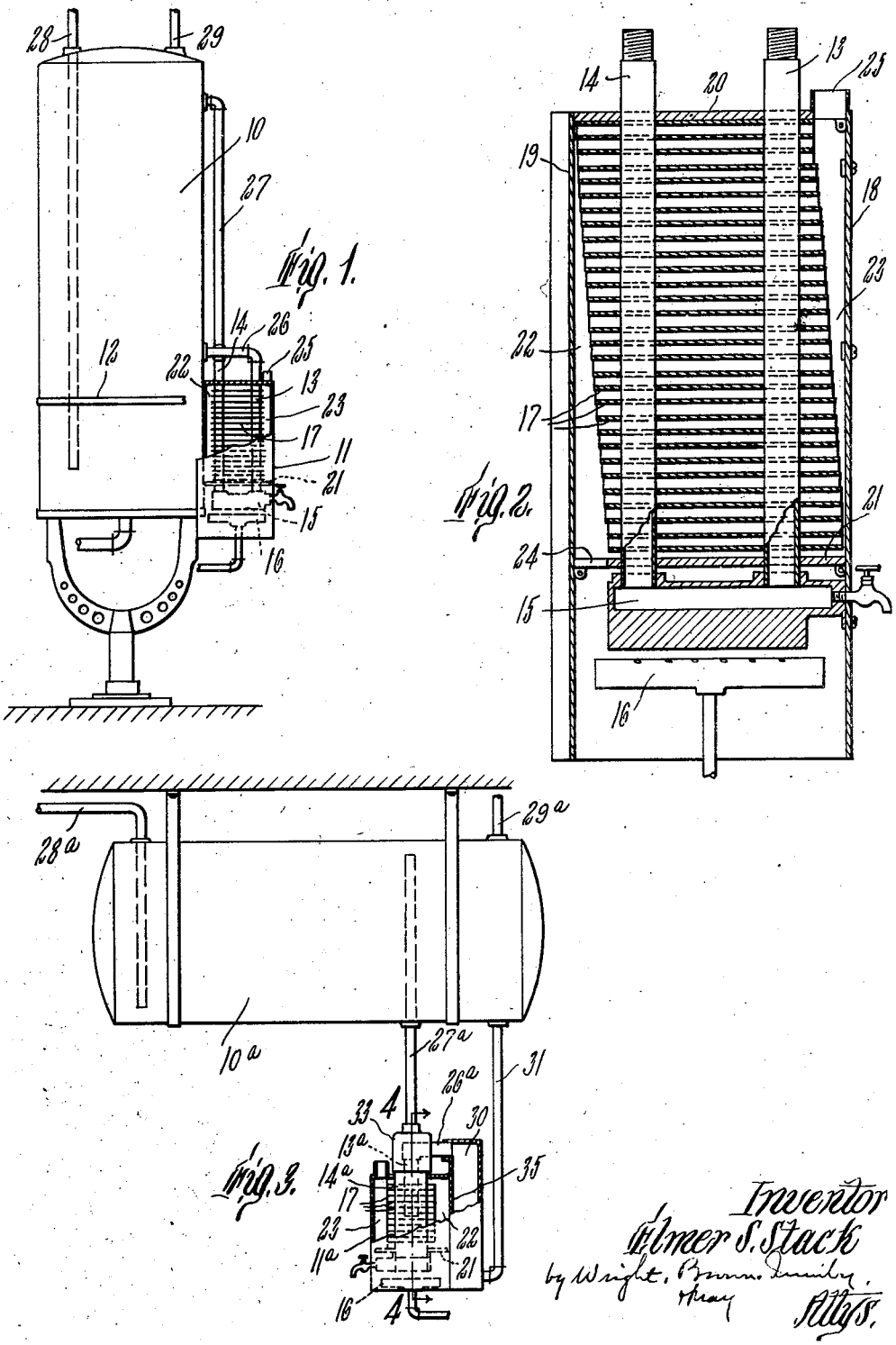

July 4, 1944.   E. S. STACK   2,352,919
PROGRESSIVE WATER HEATING SYSTEM
Filed May 16, 1942   3 Sheets-Sheet 2
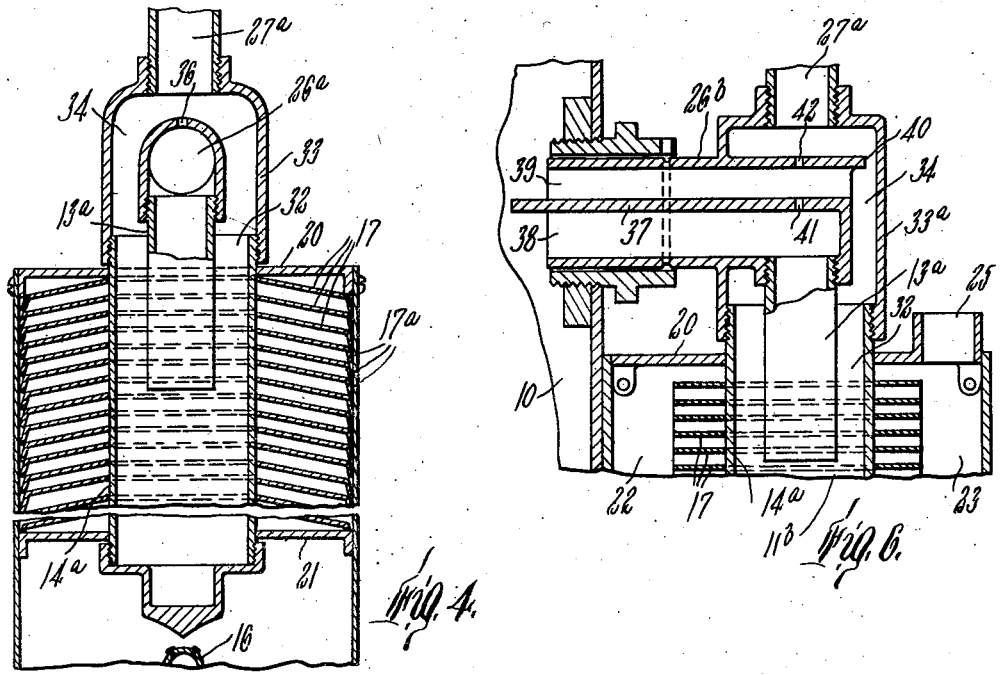
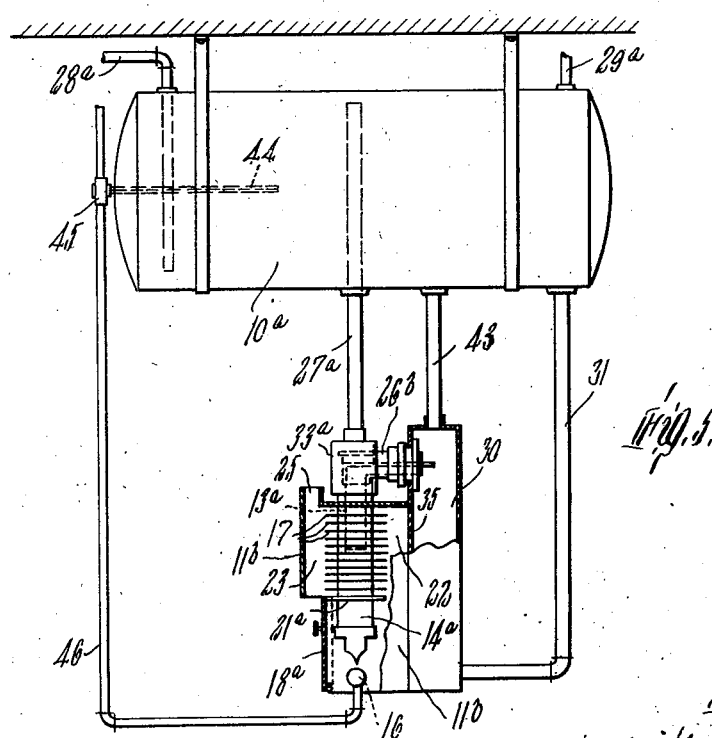
Inventor
Elmer S. Stack
by Wright, Brown, Quinby & May
Attys.

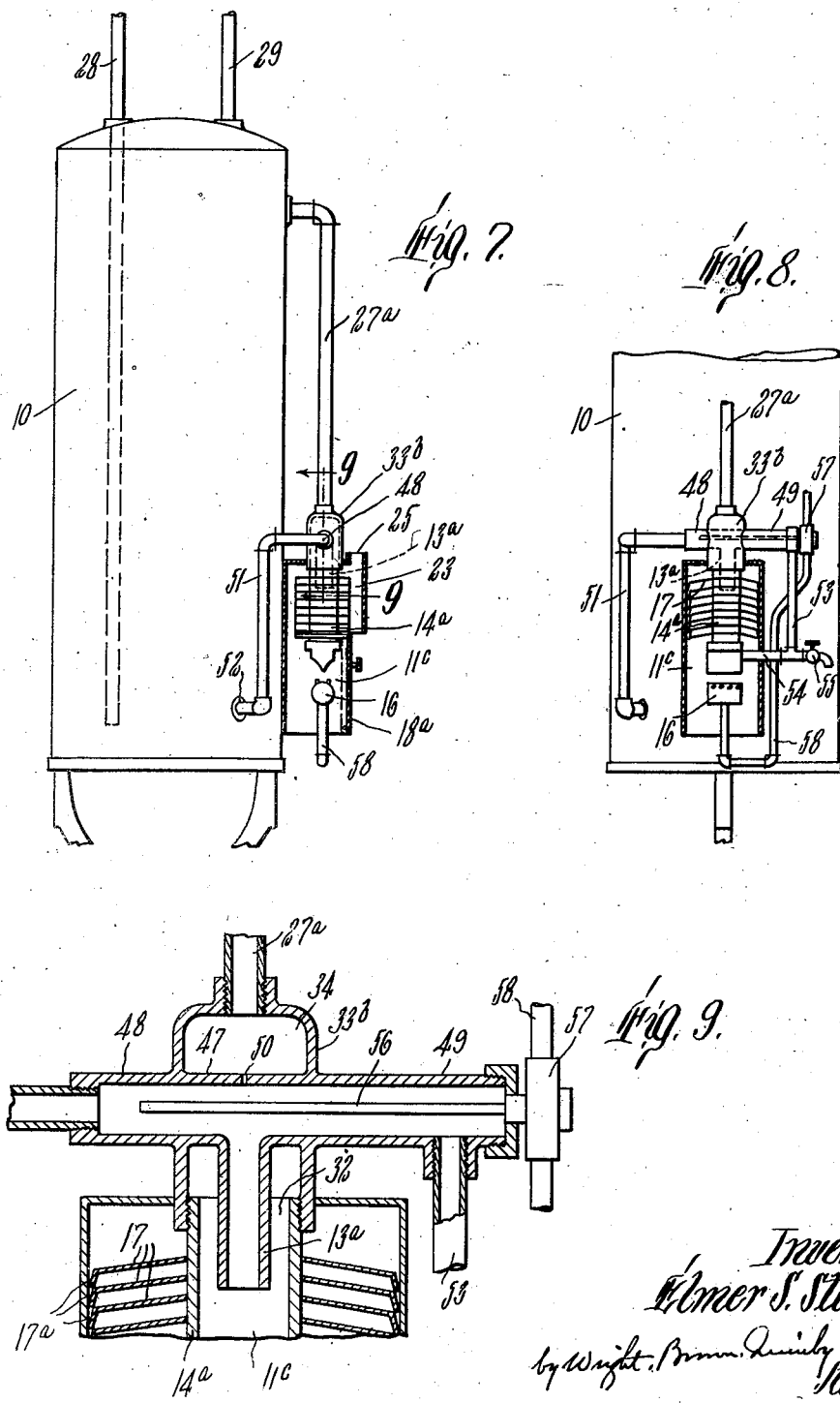

Patented July 4, 1944

2,352,919

UNITED STATES PATENT OFFICE 2,352,919

PROGRESSIVE WATER HEATING SYSTEM

Elmer S. Stack, Arlington, Mass.

Application May 16, 1942, Serial No. 443,295

22 Claims. (Cl. 122—14)

The invention hereinafter set forth is concerned with the heating of water for washing and other uses in homes and other places of human occupancy. More particularly it is concerned with the combination of a water heater with a storage tank to which water is delivered by the heater, and from which the water is drawn as needed for use. Its objects are to obtain a more efficient heating of water by the heating agent, reduce the waste of heat to the practicable minimum, and substantially eliminate condensation of water on the parts of the heating system when the heating agent is generated by the combustion of fuel, and wholly eliminate all the bad effects of condensation.

Generally the heating agent in apparatus of this type is inflammable gas burned beneath the heater; and that agent is preferably used in all the embodiments of my invention. Hence in the following description I will generally refer to the heating agent as gas, or the products of combustion, and to the agency for effecting generation of heat as a gas burner. But other fuels may be used and burned with the aid of means known to be suitable for burning them; and indeed other heating agents than the products of combustion of fuel; and such agents are comprehensively included within the meaning of generic terms hereinafter employed to designate a heat generator in combination with the heating system.

The invention comprises the combination of water heater and heat generator, with a storage tank so related to the heater as to receive heat from the generator and to deliver to the heater water which has received a preliminary degree of heating from the generator. A portion of the tank in such combination constitutes a preheater. The invention further comprises the equivalent combination of heater and heat generator with a preheater which in itself is not a storage tank, but performs the same function as the preliminary heating portion of the tank in the combination first mentioned. Such preheater may be coupled with a storage tank to receive cold, or cooler, water therefrom. The invention further comprises the combination with such storage tank or preheater and heat generator, of a water heater organized to heat the water further in two stages.

This application is a continuation-in-part of my prior application for Water heater Serial No. 150,969, filed June 29, 1937 (Patent No. 2,311,484, February 16, 1943), in which the invention above briefly outlined is disclosed in connection with a number of forms of water heater all embodying the same principles.

In the drawings herewith provided to illustrate the invention,

Fig. 1 is an elevation of the fundamental storage tank, heater, and heat generator combination with the heater casing partially broken away to show the characteristics of the heater;

Fig. 2 is a sectional view on a larger scale of a modified form of the specific heater shown in Fig. 1;

Fig. 3 is a view of the same character as Fig. 1 showing a variation in the same combination, in which a pre-heating water container, separate from the storage tank but coupled with it, is associated with a water heater of specifically different design than the one shown in Figs. 1 and 2; embodying the same principles;

Fig. 4 is a sectional view of the upper portion of the specific design of heater shown in Fig. 3 taken on line 4—4 of Fig. 3;

Fig. 5 is an elevation of the same character as Figs. 1 and 3 showing still another design of water heater, embodying the same principles; associated with a preheating water container and a storage tank in the same manner as represented in Fig. 3;

Fig. 6 is a detail sectional view of the upper part of the water heater shown in Fig. 5;

Fig. 7 is a view of the same character as Figs. 1, 3 and 5 showing a further combination of storage tank and heater in which the heater is connected in contact with the tank;

Fig. 8 is a sectional elevation of the same as seen from the right of Fig. 7;

Fig. 9 is a detail section of the upper part of the heater shown in Figs. 7 and 8, and the water connections therewith, taken on line 9—9 of Fig. 7 and shown on a larger scale.

Like reference characters designate the same parts wherever used in all the figures.

In the combination shown in Fig. 1, a storage tank of the type commonly used in domestic water heating and storage systems, is shown, and is designated by the reference character 10. A water heater 11 is mounted against the side of the lower part of the tank, being secured and held closely against the same by any suitable means, such as a strap or rod 12 passed around the tank and connected at its ends with the casing of the water heater, as described in my parent application Serial No. 150,969 (Patent No. 2,311,484).

The heater here shown is composed of two water sections 13 and 14, which are shown as lengths of pipe or tubing, a cross connection 15 serving as a heat receiving chamber, with which the lower ends of the sections 13 and 14 are connected and through which communication from one to the other is established, a heat generator 16 in the form of a gas burner, heat absorption fins 17 and an enclosing casing. The casing consists of front and back walls 18 and 19, side walls, a top wall 20 and a baffle or partition 21 above the cross connection 15 and below the lowermost fin 17. The rear wall 19 is curved to fit the curvature of the storage tank, and the side walls are made sufficiently strong and rigid to support connections for the holding strap 12. The front wall is removable to give access to the water sections and fins for cleaning them.

When the heater is placed against the side of the tank, the casing wall 19 is in contact with the tank wall and transmits heat from the products of combustion rising through the flue, later described, to the tank wall and the body of water contiguous thereto in the tank. However, the wall 19 may be omitted and the side walls of the heater fitted at their bounding edges closely enough to the tank wall to define a flue of which the tank is the rear wall and in which the products of combustion are confined.

The water sections 13 and 14 of the heater pass through the top wall 20 and partition 21, and may be made fast in and supported by either or both. They likewise pass through the fins 17, the latter being plates of sheet metal or thin castings of metal, such as copper or any other metal which is sufficiently refractory and resistant to corrosion, and has sufficiently good heat conductivity. These fins are perforated to receive the water sections and the boundaries of the perforations may be of a diameter to fit tightly on the water sections, and may be bonded to the sections by soldering brazing or welding, if desired, to effect the best possible conduction of heat.

The fins extend substantially horizontally from front to rear, terminating short of the front and rear boundaries of the casing to leave rising spaces or flues 22 and 23, of which the former is the flue previously referred to. An opening 24 in the partition 21 registers with the rear flue 22, the fins are spaced apart vertically, leaving many substantially horizontal channels extending from one flue to the other, and the front flue registers at its upper end with an outlet 25 in the top wall 20. The partition 21 extends across the bottom of the flue 23. Thus the hot gases from the burner are caused to pass to the rear flue 22, travel forwardly in numerous streams to the flue 23, and escape from the outlet 25. In order to cause a more uniform distribution among the several horizontal channels than would otherwise occur under some conditions, the fins may be located with a stepped arrangement, such that fins at higher levels extend further toward the tank than those at lower levels. Such an arrangement is shown in Fig. 2; which shows also an optional oppositely stepped disposition of the front edges of the fins. Fig. 1 shows the fins in vertical alinement at both front and rear edges. Except for this difference in detail the heater shown in these two figures is the same.

Circulating connections between the heater and the tank are made by a pipe 26 leading from the side of the tank at a point above the heater to connection with the upper end of the water section 13, and a pipe 27 leading from the upper end of the water section 14 into the side of the tank near the top of the latter. The usual cold water supply pipe 28 enters the top of the tank and extends downward therein to a low level, where it discharges. The pipe for delivering hot water from the tank is indicated at 29.

The height dimension of the heater is much less than that of the tank, and it is located in a position low enough to bring the burner at or near the level of the tank bottom. The point of connection of pipe 26 with the tank is at or above the level of the upper end of heater section 13. It is above the level of the discharge point of the inlet pipe 28 and a considerable distance below the point where pipe 27 connects with the tank.

In the operation of this heating system, the products of combustion from the burner (or other heating agent) pass upwardly through the flue 22, delivering heat to the water in the adjacent part of the tank. A fraction of them passes all the way to the top of the flue before being deflected to the outlet, while other fractions at lower levels pass through the channels between the fins, and thence to the flue 23 and the outlet. Water from the tank flows to, and downward in, the water section 13 of the heater, thence through the connecting chamber 15 to the lower end of water section 14, and thence upwardly through the section 14 and pipe 27 to the upper part of the tank.

A progressive heating of water occurs in a number of successive stages. That portion of the tank against which the heater is placed is a preheating water container in which the water is given a preliminary degree of heating by the hottest products of combustion rising from the burner through the flue 22. This warmed water, passing through pipe 26 to the top of section 13 and flowing downward therein, is further heated by gases which have previously parted with much of their heat, receives more heat in the chamber 15 from the flames of the burner, and is finally heated to the prescribed degree, during its upward passage through the section 14, by the gases of highest temperature. At the same time the gases progressively lose heat in their passage through the channels between the fins and in contact with the water sections until they are discharged at a temperature which reduces the loss and waste of heat to the lowest practicable degree.

Thermal circulation of the water in the directions above described takes place because the water in the tank at the level of the connection 26 is cooler, and therefore denser, than that in the section 14 and pipe 27, wherefore it flows downward in section 13 and displaces upwardly the water in section 14. The temperature given to the water in the lower part of the tank by the hot gases is of course much lower than that in the section 14, due to the much larger ratio of volume to area of contiguous heating surface in the tank. When the system is put into operation with all parts at the same temperature, circulation is started in the desired direction because the hot gases rising in the flue 22 deliver part of their heat to the eduction section 14 before arriving at the induction section 13, whereby the water in section 14 is heated sooner and to a higher degree than that in the section 13. Flow then starts before equal heating of the water in section 13 can occur; and a sufficient difference of temperature and density to continue the circulation is thereafter maintained. Improved efficiency in the transfer of the available heat into the water is thus obtained.

Another important effect of the combination and construction shown is the elimination of all the bad effects of condensation of water vapor from the hot gases generated by combustion of gas or other fuel. The coldest surface on which the hot gases impinge is the side wall of the tank, or the heater casing wall in contact with it when such a wall is provided. But the gases are so hot in this region, and rise in such large volume through the flue 22, without obstruction, that their loss of heat into the tank water is insufficient to chill them below the dew point of the contained water vapor, wherefore no condensation occurs there. Then the preheated water is further heated in the section 13 until its temperature is above the dew point of the exhaust gases. The higher water temperature in the section 14 is too high to cause any condensation in that region. Even if condensation occurs on the upper levels of the section 13, it has no ill effect, because it is evaporated from the fins before accumulating in sufficient quantity to drip. The fins are so thin and extend outwardly from the water section so far that they are heated in their outer reaches to temperatures enough higher than those of the section walls to insure evaporation of any such condensate. When the system is first put into operation with all parts full of cold water, some condensation occurs in the form of discontinuous beads of water. But these soon evaporate. But heating systems of this invention are very seldom required to be started in the cold condition because, when put to use in their intended and usual manner, they are thermostatically controlled with continuous generation of heat by the burner.

That part of the storage tank in which water is heated has been called a preheating water container in the foregoing description. Its function as a preheater is distinct from the function of the balance of the tank as a storage container for hot water, and the part contiguous to the heater may be partitioned off from the rest of the tank, or made a separate structure, provided only that it is in flow communication with the storage tank. Equivalent combinations where the preheating container is structurally separate from, but functionally combined with, the storage tank are shown in Figs. 3 and 5. In these figures a common form of storage tank which is suspended from an overhead floor or ceiling is shown and is designated 10a. The preheating water container is designated 30. It is connected to receive water from the bottom of the tank by a pipe 31 which leads to its own lower portion. A pipe 26a leads from the upper part of this container into the upper end of the receiving section of the water heater, and the delivery pipe 27a from the water heater passes through the bottom of the storage tank to a high level therein, where it discharges heated water. The supply and delivery pipes of this storage tank are shown at 28a and 29a respectively.

In the heater illustrated in Fig. 3, with further illustration on a larger scale in Fig. 4, the main or final water heating section is a tubular body 14a of substantially larger diameter than the receiving section 13a and is mounted for use with its enclosing walls upright. Its lower end is closed and located above the burner. The receiving section 13a passes into the upper end of the main section 14a, being surrounded by an annular space 32, and extends downward a distance sufficient to cause a preliminary heating of the water therein, by hot water in the annular space 32, before mingling with the water in the lower part of the main section, to a degree high enough to prevent condensation of water on the outer surface of the main section. A fitting 33 is secured to the upper end of the main section 14a, having provisions for connection with the delivery pipe 27a, and enclosing a space 34 through which hot water may flow to the delivery pipe. The connecting pipe 26a from the preheating container leads through the side of fitting 33 across the space 34. The heater casing and preheating container are connected together in any suitable mode of construction and have a common wall 35. Fins 17, substantially like those previously described, are mounted on the main section 14a extending substantially horizontally from front to rear, and terminating short of the wall 35 and of the front heater casing wall, to provide flues 22 and 23 for passage of the hot gases from the burner upwardly in contact with the wall 35 and the fins, thence forwardly in parallel streams in contact with the sides of the main heater section and with the fins, and thence upwardly to the outlet. A baffle or partition 21 like that shown in Fig. 2, having an opening in register with the rear flue 22, is provided here to cause rise of the hot gasses from the combustion chamber into the uptake flue exclusively. A vent opening 36 is made in the top of connection 26a, within the space 34 to permit escape of air entrained with the water, and so prevent such accumulation of air as would block water circulation.

Thus the water is given a preliminary degree of heating in the container 30, is further heated in the receiving section 13a by hot water in the annular space 32, and is further heated to the prescribed degree by impingement of hot gases on the main section 14a and conduction of heat by the fins. Condensation is prevented by reason of the high temperature and large volume of gases flowing past the wall 35 and the fact that the water entering the main heater section 14a is heated to a temperature above the dew point of the gases before reaching the walls of that section. Circulation of water is started in the desired direction, when the heater is put into operation with all parts at the same temperature, by reason of the fact that the water in the annular space 32 is heated more rapidly than the water in the preheating container 30, and is brought to a higher temperature than that contained in the inlet section 13a, and is free to pass upward immediately to the outlet pipe 27a.

A similar combination with added features is shown in Figs. 5 and 6. In Fig. 5 the heater 11b and preheating container 30 are separate from the storage tank but connected to it, as shown in the drawings, and the heater is connected to the preheating container 30 by the pipe 26b. In Fig. 6 an identical heater is directly attached to the tank and an identical pipe 26b connects the heater to that part of the storage tank which serves as a preheater. The pipe 26b is divided by a transverse partition 37 into a lower passage 38 and an upper passage 39. The pipe 26b extends into the fitting 33a, (which otherwise is substantially like the fitting 33), and part way across the inner space 34 therein. Passage 38 is connected at its under side with the receiving section 13a of the heater and is closed at its extremity within the fitting 33a. The upper passage 39 is open at both ends, and the wall which overlies this passage is provided with a ledge 40 extending partially across the space between the inner end of the pipe 26b and the adjacent wall of fitting 33a. Vents 41 and 42 are formed in the partition 37 and in the top wall of the connecting pipe 26b, within the fitting 33a, to permit escape of air. It may be noted that the pipe 26b and fitting 33a are here shown as of integral unit construction; but they may be fabricated by assemblage of originally separate parts.

The heater shown in reduced scale in Fig. 5 is identical with that shown in Fig. 6 as to the particulars last described; and in other respects both heaters are, or may be, identical with that shown in Figs. 3 and 4. The combinations of Figs. 5 and 6 differ from one another only in the particular that, in Fig. 6, both passages in the heater connection 26b open directly into the storage tank, while in Fig. 5 these passages open into a separate preheating container 30 in circulating connection with the storage tank by the pipes 31 and 43. As is plainly shown in Fig. 5, pipe 31 connects the bottom portions of the tank and container 30, while pipe 43 connects the upper levels of the container, above the entrance point of passage 39, with the lower levels of the storage tank.

Fig. 5 shows also in a conventional manner a thermostat 44 in the storage tank and a valve 45 in the supply line 46 to the burner 16 for shutting down the supply of fuel when the water temperature at the level of the thermostat is heated to a predetermined degree. It may be understood without further illustration that all embodiments of this invention are, or may be, equipped with thermostatically controlled means for regulating the generation of heat in the heater under control of the temperature of heated water supplied to the storage tank.

In combinations employing the two passages 38 and 39, or their equivalents, water circulation takes place through the passage 38 and receiving section 13a downwardly into the main section 14a, thence upward through the spaces within the fitting 33a around the intruding portion of the pipe 26b and through the outlet pipe 27a to the upper part of the tank. A portion of the water which flows upward past the end of passage 39 is deflected by the lip 40 and returned to the tank, either directly as in Fig. 6, or through the upper part of the preheating container 30 and pipe 43.

The value of the branch passage 39 is that it provides a second path for circulation of water when no hot water is being drawn from the system, preventing the water from being heated to an unnecessary degree when a heater of large capacity is used in the system. When no water is being drawn, the accumulation of hot water causes gradual rise of temperature in the tank at progressively lower levels. Hence the density of the water in the upper part of the tank is diminished, and may approach more or less closely to the specific gravity of the water in the rising pipe 27a. The circulation then becomes more sluggish, with possibility of heating the water to a higher degree and consuming more fuel than is desired before the thermostat 44, or a thermostat in the tank 10 of Fig. 6 at a level above passage 39 and considerably below the top of the tank, acts to reduce the fuel supply to the burner. That is, in the absence of such a channel as the passage 39, such liability exists. But this passage provides a secondary channel for circulation through which hot water may pass to substantially cooler water in the low levels of the tank, below the thermostat, causing less reduction in the flow of cooler water to the heater than would otherwise be the case, and shortening the time interval before the thermostat is affected by water warm enough to cause the fuel supply to be shut down. But this branch passage does not appreciably affect the flow of hot water through the uptake pipe 27a when water is being withdrawn from the tank, or after the water in the upper levels of the tank has been reduced in temperature in consequence of withdrawals.

A combination alternative to that last described, designed particularly to cause sensitive action of thermostatic heat control means, is shown in Figs. 7-9. A heater 11c, essentially like those shown in Figs. 3 and 5, is mounted against the side of a storage tank 10, as in the arrangements of Figs. 1 and 6. The upper part of this heater is constructed of a fitting 33b in connected union with the upper end of the section 14a, through which extends a conduit 47 in alined connection with external pipes or branches 48 and 49 at opposite sides of the fitting. These last named elements are in horizontal alinement when the heater is set up for use and enclose a continuous passage. The receiving section 13a is joined in communication with the under side of the conduit 47 and extends downwardly into the upper part of the outer or main section 14a, being surrounded by a water space 32 therein. The interior space 34 is wider than the exterior of conduit 47 and affords channels on either side of the latter for free passage of hot water to the delivery pipe 27a leading to the upper levels of the tank. As in the case of the corresponding fittings of the previously described heater, the parts last described are joined in water tight union, either through being made as an integral casting or by fabrication so as to exclude entering water from the chamber 34, (except for such negligible quantity as may pass through the vent 50 in the top of conduit 47), and exclude outflowing hot water from the conduit 47 and its branches when water is being withdrawn from the system.

The branch 48 is adapted to be connected at the same level with the tank, or with a separate preheating container, as in Figs. 3 and 5, and such mode of connection is a feature of the invention. However, I have chosen to show in Figs. 7 and 8 how this branch may alternatively be connected through an upright pipe 51 with the tank through a tapping 52 near the bottom, such tapping being a standard feature of common storage tanks. The practical advantage of so using the standard tapping is that it avoids necessity of making a special tapping in the tank at the height of the receiving end of the heater.

From the branch 49 a pipe connection 53 leads to the bottom of the heater outside of the heater casing, being conveniently coupled to the same pipe 54 to which the drainage cock 55 is connected.

A thermostat 56 is mounted in the branch 49 and extends therefrom through the conduit 47 and into the inlet branch 48, crossing the entrance to the receiving section 13a of the heater. Such thermostat may be of any character and construction suitable for use in the manner indicated, and is connected to operate a valve 57 in the fuel supply line 58 leading to the burner. The thermostat and valve are organized to reduce the fuel supply when the water temperature rises to a prescribed degree, and increase the fuel supply when the temperature falls below that degree. Preferably the adjustment is such that the burner is turned down to a low standby flame without being extinguished when the high temperature condition occurs. But the effects due to such low flame, presently described, may also be achieved by a pilot flame if the main burner is totally extinguished, provided the pilot flame is located to deliver heat effectively.

When hot water is drawn from the top of the tank, cold or cool water flows in equal measure to the heater intake 48 and in small part through the connection 53. The latter connection has a much smaller bore than the receiving section 13a, or is otherwise restricted so that the flow through it to the heater is a minor fraction of that through the section 13a. Thus the thermostat, while water is being withdrawn from the system, is surrounded by continually renewed cool entering water which effectively insulates it from the heat of the outflowing hot water. But when withdrawal ceases, the flow is at once reduced to the slow thermal circulation between tank and heater. Then heat from the water in chamber 34 quickly penetrates to the thermostat and shuts down the burner before the water in the top of the tank is heated to an unnecessarily high degree or an unnecessary quantity of hot water has accumulated in the upper levels.

The thermostat is thereafter prevented from increasing the heat generation until more water is withdrawn, by slow circulation through the secondary channel furnished by the pipe 53. The low maintenance flame, or pilot flame, previously mentioned, keeps the heater warm enough to cause thermal circulation upwardly through the receiving section and downwardly through the pipe 53 when the latter is cooler to a lower temperature (as it is by the atmosphere outside of the heater) and when flow from the tank ceases by reason of cooling of the water in the delivery pipe 27a. An important saving of fuel results from thus preventing the flame from being turned on and off during idle periods of the system; i. e., when water is not being drawn. But instantly upon withdrawal of any water, the cold water from the tank acts on the thermostat before entering the heater and causes the burner to be turned on. The heater just described is equipped with fins 17 arranged to provide a flue between their rear ends and the rear wall of the casing, or wall of the tank, with horizontal channels between the fins and an exhaust flue in the front of the heater casing into which such channels open. And the tank is coupled with inlet and delivery pipes, as in the preceeding illustrations.

A feature of the heater, which is applicable to all forms of heater illustrated in this and my parent application (Patent No. 2,311,484), is shown in Figs. 5 and 7. In most installations, the outlet 25 from the heater casing is connected to a pipe leading to a chimney, or otherwise arranged to conduct the products of combustion out of the room where the heater is installed. The products of combustion may be cooled in such pipe below the dew point of the water vapor contained in them, and the feature now being described affords provisions for harmless disposal of the water therein condensed. The part 18a of the front wall of the casing, below the lowermost fin is offset to the rear by an amount about equal to the depth of the uptake flue 23, leaving this flue entirely open at its lower end. At the same time the lowermost fin, or a baffle 21a analogous to the partition 21, is disposed adjacent to the wall section 18a so as to prevent flow of gases from the burner directly to the flue 23 and compel them to pass first to the rear flue 22. Water condensed in the gas exhaust pipe is thus enabled to drip through the flue, or flow in a film adhering to the front or side wall thereof, to a waste receptacle or connection without impinging on the fins or water sections of the heater. This arrangement causes air flow induced by chimney draft to pass directly to and through the flue 23 without passing through the heater and chilling it. Only the products of combustion and the air required for combustion pass through the heater.

In most of the drawings, the longitudinal or front to rear arrangement of the fins is shown. Figs. 4, 8 and 9 show a desirable lateral arrangement of the fins. They extend to opposite sides of the water-containing portions a sufficient distance to collect heat and acquire a high enough temperature for the purposes described. Their outer margins 17a are provided with downward flanges, the height of which is preferably equal to the prescribed vertical spacing between the fins. Said flanges form the lateral outer boundaries of the channels between the fins, keeping the gases out of contact with the side walls of the heater, and they may be spaced away from the side walls sufficiently to leave insulating spaces whereby heat radiation from the sides of the heater may be reduced. Preferably, the fins are inclined downwardly and outwardly away from the water containing member or members in order to cause the gases generated when the flame is turned low, which are of small volume in comparison with those generated by the full flame, to flow next to the water section when insufficient in volume to fill the channels.

These characteristics of the fins may be combined with all forms of heater illustrated in the present drawings. Either of said forms, and also the other forms of heater shown in my parent application (Patent No. 2,311,484) and not here reproduced, may be combined with storage and preheating water containers in either of the ways shown in Figs. 1, 3, 5 and 7 hereof, and in other equivalent combining forms. The protection hereby sought is not restricted to these illustrative designs of structure and combination, but include others which may be made by designers skilled in this art to employ the same principles, all within the scope of the appended claims.

What I claim and desire to secure by Letters Patent is:

1. A water heating apparatus comprising a water container and a water heater associated side by side with a rising flue between them, means for causing heating fluid to pass into the bottom of said flue and rise in thermal contact with said water container, said heater having a downwardly extending receiving water section and an upwardly extending delivering water section in flow communication with one another at their lower portions, a connection arranged to lead water which has been heated in said container to the top of said receiving section, an eduction connection for hot water leading from the top of said delivery section, and guiding means arranged to conduct the heating fluid from said flue past said sections; the delivery section being located to absorb heat from the heating fluid prior to the transmission of heat into the receiving section.

2. A water heating apparatus comprising a water heater divided into two portions, one of which has an inlet connection at its top and the other of which has an outlet connection at its top, said portions being in intercommunication at their lower portions for flow of water from one to the other, a preheating water container, means to deliver water from said container into said inlet connection, a heat generator below said heater, and guide means forming conduits arranged to conduct hot gases from said generator upwardly between the heater and said preheating container, in thermal contact with both, and transversely away from said container across the heater.

3. The combination of a water heater, a preheating water container, and a burner; the heater having water sections located at a higher level than the burner, the preheating water container being located beside said water heater, means to connect said container with the top of one of said heater sections for delivery of water thereinto, and the other heater section being arranged to receive water from the before named section and having a delivery outlet at its top; there being a rising flue between the heater and preheating container arranged to conduct products of combustion upwardly from the burner in thermal contact with the container, and the heater having fins in heat conducting connection with it arranged one above another and extending substantially horizontally away from the flue with spaces between them open to receive products of combustion from the flue.

4. A water heating and storage system comprising the combination of a storage tank and preheating container, a water heater mounted beside said preheating container with a flue between them, means arranged to deliver heating fluid into the bottom of said flue, heat conducting fins in conducting proximity with the heater extending substantially horizontally from said flue and spaced apart vertically with channels between them open to receive heating fluid from the flue, said heater having a receiving section, means to pass water from said container to said section, and a delivery section arranged to receive water from said receiving section and being disposed with respect to said fins and channels to receive heat from the heating fluid prior to transmission of heat to the receiving section.

5. A water heating system comprising the combination of a storage tank with a water heater; the water heater comprising a water containing portion having inlet and outlet connections, fins in heat conducting relation with said sections extending laterally therefrom and being substantially horizontal in the front to rear direction, a casing having walls enclosing said fins and associated with the storage tank to provide a rising flue between the side of the tank and the rear ends of the fins, and also enclosing a rising flue contiguous to the front ends of the fins, the fins being spaced apart vertically with channels between them opening into both flues, means for conducting water from an intermediate level of the tank to the inlet connection of the heater, means for conducting water from the outlet connection of the heater to the upper part of the tank, and means for delivering heating fluid into the bottom of the flue adjacent to the tank.

6. The combination with a storage tank, of a water heater disposed against the lower portion of a side of said tank, and having a water section, means for applying heat to said section and to the contiguous part of the storage tank, a connection from a point in the storage tank near the level of the upper end of the heater leading into said heater and including a receiving section extending downwardly in the first named water section and separated by an annular space from the walls thereof, and an outlet connection arranged to conduct water from said annular space to the upper part of the tank.

7. The combination of a storage tank and a water heater located in contact with the side of the tank at the lower portion thereof and in water receiving and delivering circulating connection therewith, a burner arranged beneath the water containing part of the heater, and guiding members forming flues and channels located and arranged to conduct products of combustion from the burner upwardly along the side of the storage tank and forwardly away from the tank in contact with the water containing part of the heater to a point of discharge distant from the tank.

8. The combination of a storage tank and a water heater mounted against the side of the tank, said water heater comprising a water containing section, heat conducting fins extending laterally from said section in superposed relation with spaces between them, and members enclosing such spaces and arranged to provide an uptake passage between the fins and the tank and another uptake passage adjacent to the ends of the fins more remote from the tank, the spaces between the fins being open into both uptake passages, a burner beneath the heater located so as to deliver products of combustion into the first named uptake passage, a water connection leading to an intake in the top of the water heater from a point in the tank at approximately the same level as said intake, and a water connection leading from an outlet in the top of the heater to a more elevated point in the tank; that part of the heater from which the outlet opens being arranged to receive heat from the hottest products of combustion, and that part into which the inlet opens being thermally more remote from the hottest products of combustion.

9. A storage tank and preheating water container in functional association for flow of water from the tank to the preheating container, a water heater having a receiving station coupled at its upper end with the upper part of the preheating container to receive water therefrom, and said heater having also a delivery section which is in communication with said receiving section at the lower portions of both sections, a connection leading from the top of the delivery section to a high point in the storage tank, said heater and preheating container being arranged close to one another with a flue between them, a burner arranged to deliver products of combustion into said flue, and means for conducting products of combustion from the flue past said delivering section in contact therewith, the delivering and receiving sections of the heater being relatively arranged so that the products of combustion transfer heat to the delivery section before giving heat to the receiving section.

10. The combination of a water storage tank, a water heater secured to one side of the tank at a low point thereof, a water connection leading from the top of the heater at a point near the tank to a high point in the tank, a second water connection leading from a lower level in the tank to the top of the heater at a point more remote from the tank than the first named connection; said heater comprising a water containing portion into and out of which said water connections lead, fins in heat conducting connection with said portion arranged in substantially horizontal planes, one above another, with spaces between them and extending away from the tank, there being an uptake passage between the tank and the nearer ends of the fins, into which said spaces open, walls embracing said passage and spaces and containing an outlet for exhaust of gases, and a burner located to deliver products of combustion into the lower portion of said uptake passage.

11. The combination with water containing means including an upper storage portion and a lower portion adapted to receive heat from an external source, of a water heater having receiving and delivering sections in intercommunication at the lower parts thereof, and means for applying heat to the lower part of said heater, a water connection from the lower portion of said containing means to the upper part of said receiving section, a second water connection leading from the top of said delivering section to the upper portion of said containing means, conducting means forming a secondary channel for flow of heated water, thermostatic heat regulating means located in position to be influenced quickly by water flowing to and from the heater, and means forming flow passages for heating fluid from the heat applying means arranged to cause such heating fluid to pass upwardly contiguous to the lower portion of said containing means, thence substantially horizontally away from the same in heat delivering relation to the heater, and away from the top of the heater at a point distant from said lower portion.

12. The combination set forth in claim 11, in which the thermostatic means is located in the first named water connection and the secondary channel conduit leads therefrom to the bottom of the heater; the second named water connection being arranged to deliver heat to the first connection.

13. The combination with a preheating water container, of a water heater having a main water heating section, a delivery conduit leading from the top of said section, a receiving section extending downwardly in said main heating section from the top thereof, a conduit leading from the upper part of the preheating container into the top of said receiving section, and a burner arranged to deliver heat both to the preheating container and the main heating section of the water heater.

14. The combination with a storage tank, of a water heater having a main heating section, a conduit leading from the top of said section to an upper level of the tank, a conduit leading from a lower level of the tank into the first named conduit, a receiving section in the heater extending from the inner termination of the second named conduit downwardly in the main heating section, and a burner arranged to deliver heat to the main heating section.

15. The tank and heater combination as set forth in claim 14, and in which a branch passage leads from the tank into the first named conduit at a level above the second named conduit.

16. A water heater and storage tank combination, in which the water heater comprises a casing mounted directly against the side of the tank, a water containing portion located beside the tank in position to leave an upright flue space between itself and the tank, flow connections between different levels of the tank and said water containing portion arranged for circulation of water when heat is applied to said water containing portion, a burner located beneath said water containing portion in position to deliver products of combustion into the lower part of said flue space, and heat collecting fins spaced apart from one another in substantially horizontal superposed positions extending from said flue space past and in contact with said water containing portion at opposite sides of the latter; the casing having an outlet arranged to discharge products of combustion flowing from said flue through the spaces between the fins.

17. The combination of a storage tank, a water heater comprising a casing mounted against the side of said tank, a water containing portion within said casing, and heat collecting fins in heat conducting connection with said water containing portion, conduits separately connecting the upper part of the water containing portion of the heater with the tank at respectively different levels, the heater being constructed with means for segregating the inflowing water from heated water in the upper part of said water containing portion, said portion being spaced apart from the adjacent tank wall to provide a rising flue passage, and the casing containing a second rising flue passage at the side of the water containing portion away from the tank, and a burner located below the water containing portion in position to deliver products of combustion into the first named flue passage; said fins being disposed substantially in horizontal planes in rising series and in heat conducting connection with said water containing portion, with passages between them opening into both of said flue passages.

18. A water heating system comprising a storage tank, a preheating water container in separate flow connection at its top and bottom portions with the tank at levels thereof substantially below the top of the tank, a water heater having a water container and means for applying heat to the lower part thereof, a flow connection for conducting water from the preheating container to the heater, a second flow connection arranged to conduct water from the top of the heater to a high level in the tank, and a flow connection between the heater and preheating container at a level intermediate the two previous connections for delivering water from the heater to the upper part of the container and thence into the lower portion of the tank.

19. The combination of a hot water storage tank and preheating container with a hot water heater contiguous to a wall of the preheating container, the water heater having a water container and heat generating means disposed to apply heat both to said preheating container and the last named water container, and a plurality of flow connections between the heater and the storage tank and preheating container, comprising an inlet connection leading into the water container of the heater, an outlet connection leading from the heater to the upper part of the tank, and an intermediate branch passage leading from the outlet portion of the heater to connection with the tank at a level below that to which the delivery connection of the heater leads.

20. The combination of a water container and water heater as set forth in claim 3, in which the heater includes fins, a front casing wall disposed with an exhaust flue between said wall and the nearer ends of the fins, and a wall section substantially beneath the rearward limit of such flue disposed to prevent direct passage of products of combustion from the burner to said flue, the lower end of the flue being open to permit entrance of air directly thereto and escape of water condensed from the products of combustion of the burner.

21. A water heating system as set forth in claim 5, in which the heater casing includes a front wall having an upper portion and a lower portion, the upper portion forming the outer boundary of the forward flue and the lower portion being directly below the forward end of the lowermost fin, the lower end of said forward flue being open between the lower end of said upper wall portion and the upper end of said lower wall portion.

22. A combination of preheating water container and water heater as set forth in claim 13, in which the heater includes a casing arranged to enclose a rising flue between the water container and the main water heating section above the burner and a second rising flue adjacent to said section away from said container, and the casing further including a wall composed of upper and lower portions of which the upper portion forms the outer boundary of said second flue and the lower portion is located inwardly from the upper portion, said second flue being open at its lower end between said upper and lower wall portions.

ELMER S. STACK.